Oct. 17, 1967  G. T. INOUYE ETAL  3,348,165
GAS CELL FREQUENCY STANDARD
Filed Nov. 9, 1964  2 Sheets-Sheet 1
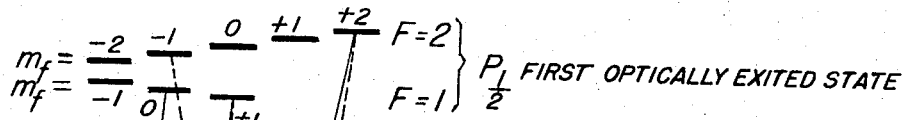
Fig.1.
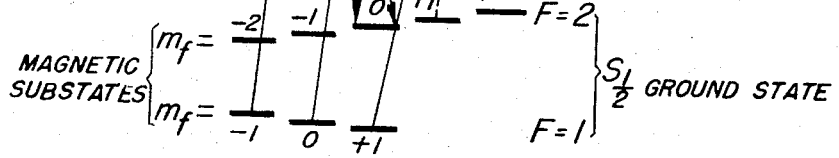
Fig.2.
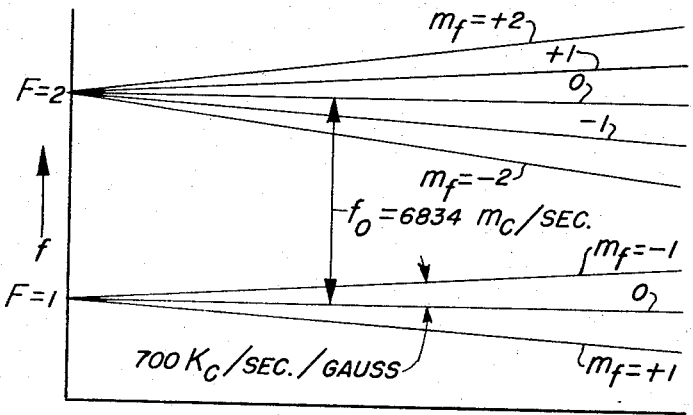
Fig.4.
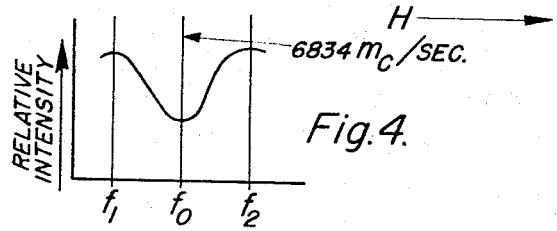
Fig.5.
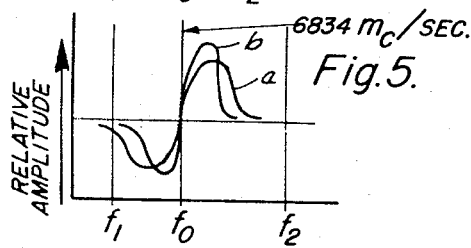
INVENTORS:
JOHN M. ANDRES,
GEORGE T. INOUYE,
GLENN L. BROWN,
*Jerry A. Dinardo*
AGENT.

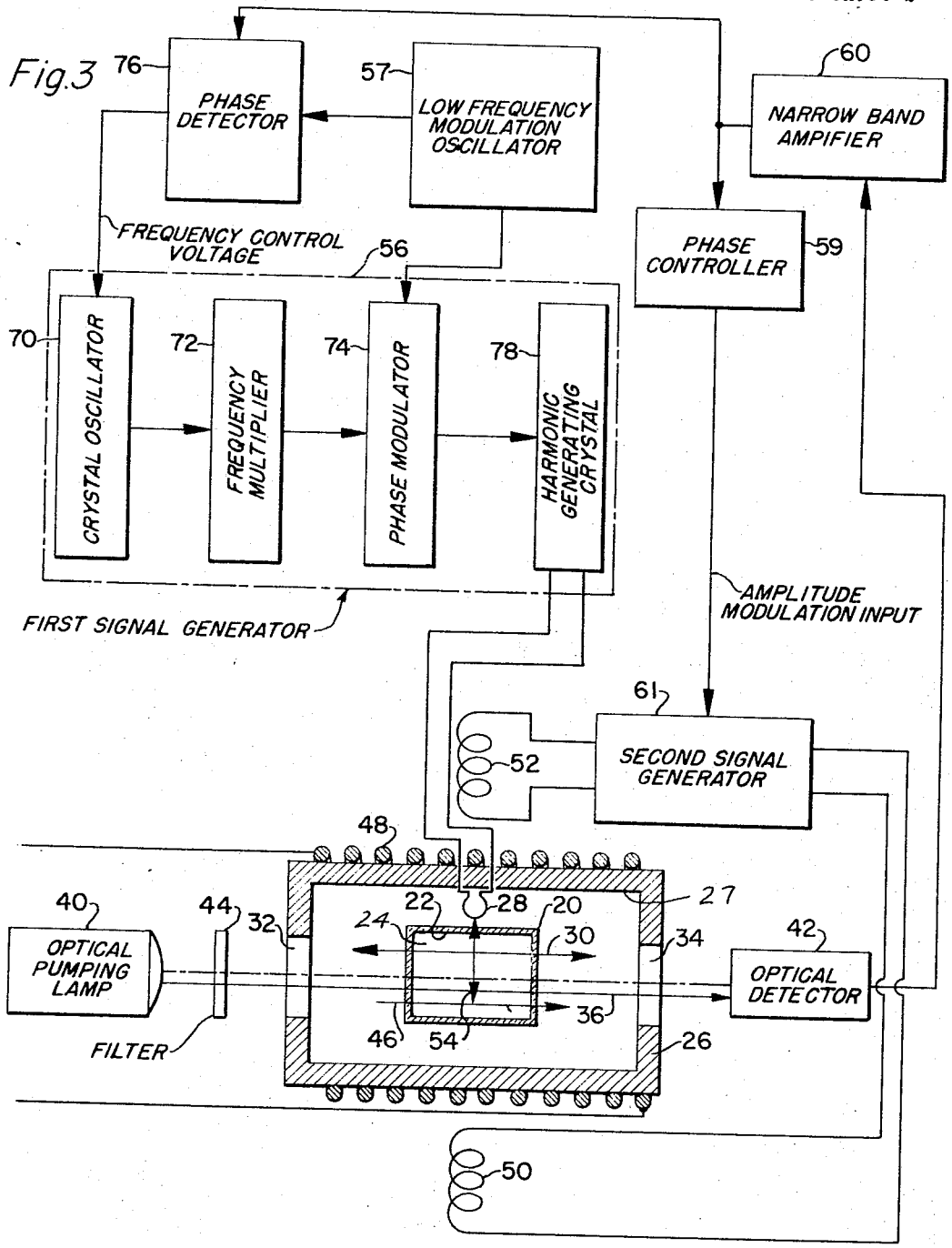

his Patented Oct. 17, 1967

3,348,165
GAS CELL FREQUENCY STANDARD
George T. Inouye, Gardena, John M. Andres, Rolling Hills Estates, and Glenn L. Brown, Granada Hills, Calif., assignors to TRW Inc., a corporation of Ohio
Filed Nov. 9, 1964, Ser. No. 409,925
6 Claims. (Cl. 331—3)

This invention relates generally to the frequency standard art and more particularly to improved methods of and means for enhancing the signal definition and narrowing the resonance line width in an optically pumped resonant medium used to control the frequency of a frequency standard signal.

For satisfactory operation of many electronic devices, such as radar, atomic clocks, computers, and the like, it is necessary to provide an alternating current input signal having a precisely controlled, known and constant frequency. The accuracy of any information obtained from such devices particularly during extended operational sequences is dependent, to a great extent, on how precisely the frequency of the input signal is maintained. One method of deriving a signal with a constant frequency is to make use of a quantum resonance corresponding to a transition between selected quantum energy levels of certain atoms, molecules, electrons or other elementary particles. To utilize this quantum resonance phenomena as a basis for controlling the frequency of a frequency standard signal it is desired to have the frequency standard signal induce the resonance phenomena and to compare the frequency associated with the resonance to the frequency of the frequency standard signal. One form of a gas cell stabilized frequency standard is described in an article published in the IRE Transactions on Military Electronics, volume MIL-3, Number 4, October 1959, by J. M. Andres, D. J. Farmer, and G. T. Inouye, entitled, "Design Studies for a Rubidium Gas Cell Frequency Standard."

To obtain good control with such a system it is desirable that the quantum resonance be "sharp," i.e., it should provide a large error signal for small deviations of the frequency standard signal from a specified frequency value.

Some of the prior devices that have employed the energy separation between selected quantum energy states as a source of a constant frequency signal have utilized only optical pumping to "sharpen" the resonance signal and have detected the energy associated with the resonance signal by means of an induction coil. Such systems have not been completely satisfactory since the signal strength for a given particle density is comparatively weak because only a few of the total number of available particles participate in the selected transition. In addition, the induction coil introduces noise into the detection system which further limits the sensitivity of such devices.

Accordingly, it is an object of this invention to provide a frequency standard with an output signal having a more precisely controlled frequency.

It is another object of this invention to provide a frequency standard signal wherein the frequency is automatically maintained at a predetermined value.

It is a further object of this invention to provide a frequency standard in which deviations of the frequency from a predetermined value result in a large detectable error signal.

The foregoing and related objects are achieved in accordance with this invention by increasing the number of particles participating in a selected energy transition and by detecting the characteristics of the optical pumping light beam itself that are proportional to the number of the participating particles.

A resonant medium is defined herein as a collection of particles having the property of being capable of exhibiting a plurality of selected quantum energy states. At least one of these energy states is comprised of two or more quantum levels, with each quantum level having a plurality of magnetic substates. The alkali metal atoms are typical of this type of atomic structure.

In one embodiment of this invention, such a medium is irradiated with an optical pumping light beam when the particles are at a preselected quantum energy state. The photon energy in the optical pumping light beam is concentrated in at least one preselected wave length that induces a transition of the particles to a second preselected quantum energy state. Energy is absorbed from the optical pumping light beam during this process and a detector is positioned to measure the changes in the intensity of the optical pumping light beam caused by this energy absorption. A unidirectional magnetic field is continuously applied to the medium to cause the particles in each quantum level to separate into a plurality of magnetic substates. When the particles at the second quantum energy state drop back down to positions in the magnetic substates of the first quantum energy state, the number of particles in the various magnetic substates is unequal. It is the difference in population between two preselected magnetic substates of different quantum levels that provides the basis for the frequency standard control signal.

When a signal at a frequency corresponding to the resonant frequency is applied to the optically pumped medium the relative populations of the two preselected magnetic substates are altered and tend to be equalized. Consequently, more energy is absorbed from the optical pumping light beam, thus reducing the intensity of the optical light beam at the detector.

This phenomena is utilized in this invention to detect the presence of the signal whose frequency corresponds to the preselected quantum resonance frequency. A frequency standard signal whose frequency is to be controlled so as to remain as close as possible to a predetermined frequency, which is the quantum resonance frequency, is applied to the medium and the frequency of the signal is modulated at a low frequency over a small bandwidth that includes the predetermined frequency. Thus, the intensity of the optical pump light beam at the detector is modulated at the same low frequency value and the detector provides an output signal at this low frequency whose amplitude is proportional to the deviations of the frequency standard signal from the resonance frequency.

In this invention the output signal from the detector at the modulation frequency is used both to control the frequency of the standard frequency signal in a feedback loop, thereby serving as an error signal, as well as to modulate the intensity of an alternating magnetic field at the Larmor frequency that is also applied to the medium. This alternating magnetic field increases the number of atoms participating in the preselected quantum transition increasing the detector output signal definition for a given deviation of the frequency standard signal from the resonant frequency. The amplitude of the modulation of the alternating magnetic field is automatically controlled so as to be a maximum when the deviations of the frequency standard signal from the resonance frequency is greatest. Thus, this alternating magnetic field is in a regenerative feedback loop with the detector output signal and therefore a precise control is exerted on the frequency standard signal to minimize deviations from the predetermined frequency.

This invention is explained in greater detail in the following description and with reference to the accompanying drawings, wherein similar reference characters indicate similar elements throughout, and in which:

FIGURE 1 is a schematic representation of the transitions between various quantum energy states of the rubidium 87 atom;

FIGURE 2 illustrates the frequency separations between various magnetic substates of the rubidium 87 atom;

FIGURE 3 is a schematic diagram of the apparatus associated with one embodiment of this invention;

FIGURE 4 shows the energy absorbed in optical pumping as related to the resonant signal frequency;

FIGURE 5 shows the error signal strength obtainable in practicing this invention.

The arrangements of this invention are predicated on certain quantum mechanics characteristics associated with the fine and hyperfine atomic structure of resonant media. Therefore, a brief discussion of these characteristics is presented prior to a detailed description of the embodiments of this invention.

The energy levels of interest in practicing this invention for a typical resonant medium are shown in diagrammatic form on FIGURE 1 as they exist in the presence of a weak applied unidirectional magnetic field. The rubidium 87 quantum structure, as shown on FIGURE 1, is utilized for illustrative purposes herein and it will be appreciated that similar diagrams may be constructed for other resonant media. The $S_{1/2}$ ground quantum energy state includes the two quantum levels, $F=1$ and $F=2$ and a total of eight separate magnetic substates: five in the $F=2$ and three in the $F=1$ level. The $P_{1/2}$ first optically excited state also has a corresponding number of F levels and magnetic substates, but the energy separations between the $F+2$ level and the $F=1$ level of the $P_{1/2}$ state are optically unresolvable while the energy separations between the $F=2$ level and $F=1$ level of the $S_{1/2}$ state are readily resolvable by optical means and are precisely known. When electromagnetic radiation in the form of an optical pumping light beam, which contains energy in a wavelength equivalent to $\lambda_1$, as shown on FIGURE 1, impinges on a collection of rubidium 87 atoms, those atoms in the $F=1$ level of the $S_{1/2}$ ground state are temporarily raised to the $P_{1/2}$ first optically excited state.

Upon return to the $S_{1/2}$ state, however, the atoms may occupy positions in either the $F=2$ or $F=1$ levels of the $S_{1/2}$ state. It will be appreciated, then, that as this optical pumping process continues there is a depletion of the number of atoms in the $F=1$ level of the $S_{1/2}$ state and an increase in the number of atoms in the $F=2$ level of the $S_{1/2}$ state. Conversely, if the optical pumping light beam contained energy substantially concentrated in a wavelength equivalent to $\lambda_2$ the magnetic substates of the $F=1$ level would have a greater particle population than the magnetic substates of the $F=2$ level.

FIGURE 2 illustrates the dependence of the frequency separations of the magnetic substates in one quantum level on the strength of a comparatively weak applied unidirectional magnetic field. In general, for a weak field, the relationship is expressed by the equation:

$$f_0 = f_{00} + \alpha H + \beta H^2$$

where:

$f_0$=frequency separation at a unidirection magnetic field strength H
$f_{00}$=frequency when $H=0$
$H$=unidirectional magnetic field strength
$\alpha, \beta$=constants For the transitions between the $m_f=0$ magnetic substate of the $F=1$ and the $m_f=0$ magnetic substate of the $F=2$ level of the $S_{1/2}$ ground state, (abbreviated $\delta F=\pm 1$, $m_f=0 \rightarrow 0$), the constant $\alpha$ in the above equation is equal to 0 and the value of $\beta$ is small. This value of $\delta f$ for the $\delta F=\pm 1$, for $m_f=0 \rightarrow 0$ transition in the rubidium 87 atom is 6834 megacycles per second and is comparatively constant over wide ranges of weak unidirectional magnetic field strengths. Therefore, by selecting this particular transition, the frequency $\delta f$ is relatively insensitive to variations in the unidirectional magnetic field strength.

The Larmor frequency is defined, by those skilled in the art, as the frequency separation between adjacent magnetic substates in an F level. As shown on FIGURE 2, the value of the Larmor frequency is dependent upon the strength of an applied unidirectional magnetic field and this relationship for a comparatively weak magnetic field is expressed by:

$$f_L = \Gamma H$$

where:

$f_L$=Larmor frequency
$\Gamma$=gyromagnetic ratio

The gyromagnetic ratio $\Gamma$ is an intrinsic property of each type of resonant medium. Therefore, the Larmor frequency varies linearly with weak unidirectional magnetic field strength. It has been found that when an alternating magnetic field with a frequency corresponding to the Larmor frequency is applied to a collection of optically pumped atoms as described above, the populations of the magnetic substates tend to be equalized. For example, if the population of the $m_f=0$ magnetic substate is less than the $m_f=\pm 1$, atoms in the $m_f=\pm 1$ magnetic substates of the $F=1$ level are induced to make a transition to the $m_f=0$ magnetic substate of the $F=1$ level. This process assists the optical pumping light beam by bringing additional atoms into the $m_f=0$ magnetic substate where they participate in the desired $\delta F=\pm 1$, $m_f 0 \rightarrow 0$ transition.

It has also been found that when a microwave resonant signal at 6834 megacycles per second is applied to a collection of optically pumped rubidium 87 atoms, transitions are induced from the over-populated $m_f=0$ magnetic substate of the $F=2$ level down to the $m_f=0$ magnetic substate of the $F=1$ level. Therefore, detection of certain characteristics of the optical pumping light beam, such as the intensity after it traverses the resonant medium provides an indication of the frequency of the resonant signal.

While rubidium 87 has been selected for illustrative purposes in describing the embodiments of this invention, it will be appreciated that many other materials may be utilized as a resonant medium. A few of the substances suitable for utilization in the practice of this invention are listed below in Table I. The Larmor frequencies specified are per unit strength of an applied unidirectional magnetic field.

TABLE I

| Magnetic Field Responsive Medium | Atomic Weight | Larmor Frequency kc./gauss |
| --- | --- | --- |
| 1. Rubidium | 87 | 700 |
| 2. Sodium | 23 | 700 |
| 3. Potassium | 39 | 700 |
| 4. Rubidium | 85 | 467 |
| 5. Cesium | 133 | 350 |

The above-described physical characteristics are uniquely utilized in this invention to provide a frequency standard signal whose frequency is precisely controlled.

FIGURE 3 shows the structure associated with one embodiment of this invention. A gas cell 20 has walls 22 that are transparent to selected wavelengths of electromagnetic radiation. In this embodiment as shown in FIGURE 3; the gas cell 20 is located in a resonator 26. This resonator 26 is designed to operate so that the magnetic field lines of an applied resonant signal 30 at 6834 megacycles per second are parallel to the axis of the resonator 26. One typical mode of operating the resonator 26 is the $TE_{013}$ mode, though many others such as $TE_{011}$, $TE_{012}$, etc. may also be utilized. The resonator 26 has walls 27 that are transparent to magnetic energy. The resonant signal 30 is induced in the resonator by current loop 28. A weak unidirectional magnetic field 46 is generated in regions containing the medium 24 by coil means 48 and is parallel to the axis of the resonator 26. The resonator 26 has apertures 32 and 34 which allow an optical pumping light beam 36 generated by an optical pumping lamp 40 to traverse the medium 24 and to be detected by an optical detector 42. The lamp 40 may contain the same kind of particles that comprise the medium 24, which for this example is rubidium 87. A filter means 44 is positioned to receive the output from the lamp 40 and adapted to transmit energy substantially concentrated in a wavelength equal to $\lambda_1$ of FIGURE 1. The optical detector 42 is adapted to be responsive to the intensity of the optical pumping light beam 36 as it impinges thereon and to provide an output signal proportional thereto. As disclosed in the IRE article referred to above, the optical detector 42 is a photosensor or photosensitive device which converts light into an electrical signal, such as a phototube or a solar cell. The optical detector 42 is coupled to a narrow band amplifier 60 for amplifying the electrical signal.

A frequency standard signal whose frequency is to be controlled is fed into the current loop 28 from a first signal generator 56. The frequency standard signal from the first signal generator 56 may, in some applications, initially be any multiple or division of 6834 megacycles per second. In such a case, suitable frequency multiplier of divider networks must be supplied so that the signal in the loop 28 is approximately 6834 megacycles.

As disclosed in the IRE article referred to above, the signal generator 56 includes a crystal oscillator 70, a frequency multiplier 72, a phase modulator 74, and a harmonic generating crystal 78. A low frequency modulation oscillator 57, which typically may have an output on the order of 107 cycles per second is coupled to the phase modulator 74 in the first signal generator 56 to provide a frequency modulation of the resonant signal 30 at 107 cycles per second. It is also coupled to a phase detector 76. The phase detector compares the signal from the modulation oscillator 57 with the amplified electrical signal from the optical detector 42 and narrow band amplifier 60 and provides a D.C. error signal or frequency control voltage to maintain the output frequency of the first signal generator 56 at the exact resonant frequency of the medium 24.

In operation, the optical pumping lamp 40 is energized by an energy means, not shown, and the electromagnetic radiation emitted from the lamp 40 is directed through the filter means 44 to provide the optical pumping light beam 36. As the pumping light beam impinges upon the medium 24 the particles comprising the medium 24 that are in the $F=1$ level of the $S_{1/2}$ ground state are temporarily raised to the $P_{1/2}$ first optically excited state. The unidirectional magnetic field generator coil means 48 is also energized to establish the weak unidirectional magnetic field 46 in the gas cell 20 containing the medium 24. As described above, this combination of pumping and magnetic field results in an over-population of the $m_f=0$ magnetic substate of the $F=2$ level of the $S_{1/2}$ ground state compared with the population of the $m_f=0$ magnetic substate of the $F=1$ level of the $S_{1/2}$ ground state. The current loop 28 is energized through the first signal generator 56 to establish a resonant condition within the resonator 26 at a nominal value of 6834 megacycles per second, illustrated by vector 30.

If the frequency generated in the current loop 28 were unmodulated by the modulation oscillator 57 and the output of the first signal generator 56 were swept slowly from a frequency $f_1$ slightly below 6834 mc./sec. to a frequency $f_2$, slightly greater than 6834 mc./sec., as the frequency in the current loop approached the resonant value of 6834 mc./sec., some of the particles comprising the medium 24 in the $m_f=0$ magnetic substate of the $F=2$ level would make a transition to the $m_f=0$ magnetic substate of the $F=1$ level. Consequently, more energy would be absorbed from the optical pumping light beam 36 as these particles are pumped back up to the $m_f=0$ magnetic substate of the $F=2$ level. This would result in a minimum light intensity at the detector 42 if the frequency in the resonator 26 were exactly 6834 mc./sec.

FIGURE 4 illustrates this minimum in the light intensity at the detector 42 occurring when the unmodulated output of the generator 56 is swept slowly through resonance.

In actual operation the output frequency of the first signal generator is modulated by the modulation oscillator 57 and the frequency of the resonant signal 30 in the resonator 26 is also modulated. In a preferred embodiment of this invention the modulation occurs at a 107 c.p.s. rate. Now if the resonant signal 30 while being frequency modulated at 107 c.p.s. is again slowly swept over the frequency range from $f_1$ to $f_2$, the output of the optical detector 42 and narrow band amplifier 60 would be seen on an oscilloscope as a 107 c.p.s. signal which increases in amplitude as the frequency increases from $f_1$ to a frequency approximately midway between $f_1$ and $f_0$, at which point it reaches a maximum amplitude.

Then as the frequency moves closer to $f_0$, the amplitude of the 107 cycles per second signal gradually decreases and becomes zero at the resonance frequency $f_0$. As the frequency increases further from $f_0$ to a point midway between $f_0$ and $f_2$, the 107 cycle per second signal reverses in phase by 180° and increases in amplitude again, reaching a maximum amplitude at a frequency approximately midway between $f_0$ and $f_2$. As the frequency approaches $f_2$, the 107 cycles per second signal gradually decreases in amplitude.

The output from the narrow band amplifier 60 is fed into the phase detector 76 as described in the IRE article referred to above, to complete the feedback loop to the frequency standard signal which is the source of the reference signal 30.

The phase detector 76 compares the audio frequency signal from the narrow band amplifier 60 with the reference signal from the modulation oscillator 57 and derives a D.C. error signal or frequency control voltage having zero value when the signal generator 56 is exactly at the atomic resonance frequency of 6834 mc./sec., and having an amplitude which is a function of the deviation of the frequency of the signal from signal generator 56 from the resonance frequency. The sign of the D.C. error signal indicates whether the frequency of the signal from signal generator 56 is above or below the resonance frequency and can therefore be used to maintain the signal generator at the resonance frequency. Thus under the operating conditions specified above wherein the resonant signal 30 is slowly swept over the frequency range $f_1$ to $f_2$ while being modulated at 107 cycles per second, the curve as shown on FIGURE 5 would appear on a chart recorder as the output from the phase detector 76.

So far the operation described is exactly the same as has been described in the IRE article referred to above. The present invention requires the addition of several new elements to the system as described to this point.

First, an alternating magnetic field means, illustrated as coils 50 and 52 is oriented to subject the medium 24 within the gas cell 20 to an alternating magnetic field 54 in a direction which, in the preferred embodiment of this invention, is oriented perpendicular to the optical pumping light beam 36. These coils 50 and 52 are designed to provide an alternating magnetic field 54 at a frequency equivalent to the Larmor frequency of the resonant medium 24 for the strength of the unidirectional magnetic field 46. For the rubidium 87 atoms, the frequency of the field 54 is 700 kilocycles per second per gauss of unidirectional magnetic field 46 strength. A second signal generator 61 powers the coils 50 and 52 to provide the alternating magnetic field 54 at a frequency of 700 kilocycles per second per gauss. The signal generator 61 may comprise any conventional radio frequency oscillator capable of supplying a signal at the Larmor frequency and capable of having an external amplitude modulation signal applied to it, such as a Type 1001–A Standard Signal Generator produced by the General Radio Company of Cambridge, Mass.

Further, in accordance with this invention, the output from the narrow band amplifier 60 is also fed into the phase controller 59 and then into the second signal generator 61 where it is used to amplitude modulate the alternating magnetic field 54. The phase controller 59 may comprise a conventional phase shifting network, such as shown in Terman's Radio Engineer's Handbook, McGraw-Hill Book Company, New York, N.Y., 1943, on page 994, FIG. 56a, for example. The phase controller 59 controls the phase relationship of the amplitude modulation of the alternating magnetic field 54 with respect to the frequency modulation of the resonance signal 30. The relationship provided is that the intensity of the alternating magnetic field 54 should be at a maximum when the frequency modulated resonance signal 30 is at that portion of the modulation cycle where it has the greatest deviation from the center frequency $f_0$ of 6834 megacycles per second and should have a minimum value when the modulated resonance signal 30 is at that portion of the modulation cycles when it is nearest the center frequency of 6834 megacycles per second. In practice, the phase relationship is obtained experimentally by adjusting the phase controller 59 so that the phase of modulation applied to the second signal generator 61 is shifted with respect to the modulation oscillator providing the modulation of the first signal generator 56 and observing the shape of the frequency control voltage output of the phase detector 76. The phase is adjusted to give maximum slope of the control voltage curve, as shown by curve b of FIGURE 5. In the absence of the phase controller 59, the foregoing desired relationship between the phase of the amplitude modulation of the alternating magnetic field 54 and the deviation of the frequency modulated resonance signal 30 will not necessarily be obtained, and thus it could not be assured that the alternating magnetic field 54 would have its greatest effect in enhancing the error signal.

By maintaining this close relationship between the modulation of the alternating magnetic field 54 and the frequency of the resonant signal 30, the maximum increase in signal definition is obtained. The alternating magnetic field 54 operates on the particles comprising the medium 24 when the transition $\delta F = \pm 1$, $m_f = 0 \rightarrow 0$ is not being induced by the resonance signal 30. As a result, particles are induced to make transitions from the $m_f = -2$, $m_f = -1$, $m_f = 0$, $m_f = +1$, and $m_f = +2$ magnetic substates of the $F = 2$ level into the $m_f = 0$ magnetic substate of the $F = 2$ level. These additional particles then participate in the desired $\delta F = \pm 1$, $m_f = 0 \rightarrow 0$ transition and provide a greater detected signal for use in controlling the frequency standard signal. Thus, curve b of FIGURE 5 shows a greater ordinate value at frequencies of the resonant signal 30 close to 6834 megacycles per second than is the case for the curve a of FIGURE 5 when no alternating magnetic field was present. Therefore, a greater error signal, as measured by the ordinate value of curve b of FIGURE 5 for a given deviation of the resonant signal 30 from 6834 megacycles per second is provided which yields a more precise control of the frequency standard signal.

In other gas cell frequency standards in which optical detection, as described above, is not utilized, this invention may also be practiced to provide a more precisely controlled frequency standard signal. Thus, if the microwave signal at 6834 megacycles per second is detected in the resonator 26, a similar feedback loop to an alternating magnetic field generator could be utilized to enhance the definition of the frequency standard signal. In addition, amplitude modulation of the resonant signal 30, e.g., a square wave modulation, as well as the 107 cycles per second frequency modulation described above could be also utilized. Many other arrangements and modifications of the apparatus associated with this invention will occur to those skilled in the art. Therefore, this invention is not limited to the specific embodiments herein illustrated and described, and the following claims are intended to cover all changes, combinations and variations which do not depart from the true scope and spirit of the invention.

The embodiments of the invention in which an exclusive property or privilege is claimed are defined as follows:

1. In combination:
    an atomic resonant gas;
    means for optically pumping said gas;
    means for applying a weak, magnetic field to said gas;
    means for applying to said gas a first signal having a resonance frequency which is characteristic of transitions between two energy levels of said gas;
    means for applying to said gas a second signal which is characteristic of transitions between one of said two energy levels and an additional adjacent energy level of said gas;
    means for periodically modulating the frequency of said first signal;
    means coupled to said gas cell for detecting deviations of the frequency of said first signal from said resonance frequency and for deriving an alternating signal which bears phase and amplitude relations indicative of said frequency deviations;
    means for modulating the amplitude of said second signal with said alternating signal;
    means for deriving an error signal from said alternating signal;
    and means for applying said error signal to said first signal means in a sense to oppose said frequency deviations.

2. The invention according to claim 1, wherein said modulating means includes a phase controller for adjusting the phase of the amplitude modulation of said second signal relative to the phase of the frequency modulation of said first signal so that the maximum amplitude of said second signal coincides with that portion of the modulation cycle of said first signal wherein the frequency deviation from said resonance frequency is maximum.

3. The invention according to claim 1, wherein said detecting means includes an optical detector for detecting that portion of optical pumping light transmitted through said gas and converting the same to an electrical signal.

4. The invention according to claim 1, wherein the resonance frequency of said first signal is calculated to induce a $\Delta F = 1$ transition in said gas, and said second signal is of a frequency calculated to induce a $\Delta F = 0$ transition in said gas.

5. The invention according to claim 1, wherein said first signal is constituted by an electromagnetic field, with a magnetic field component thereof arranged parallel to the direction of said weak magnetic field.

6. The invention according to claim 5, wherein said second signal is constituted by an electromagnetic field with a magnetic field component thereof arranged perpendicular to the direction of said weak magnetic field.

References Cited

UNITED STATES PATENTS

| 3,165,705 | 1/1965 | Dicke | 331—3 |
| 3,174,114 | 3/1965 | Arditi | 331—94 X |

ROY LAKE, *Primary Examiner.*

J. B. MULLINS, *Assistant Examiner.*